United States Patent
Qian et al.

(10) Patent No.: US 8,766,932 B2
(45) Date of Patent: *Jul. 1, 2014

(54) TOUCH PANEL WITH TRANSPARENT INSULATOR TO REDUCE CHROMATIC DISPERSION AND DISPLAY DEVICE INCLUDING THE SAME

(75) Inventors: Li Qian, Beijing (CN); Yu-Quan Wang, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 502 days.

This patent is subject to a terminal disclaimer.

(21) Appl. No.: 12/853,524

(22) Filed: Aug. 10, 2010

(65) Prior Publication Data

US 2011/0115740 A1    May 19, 2011

(30) Foreign Application Priority Data

Nov. 18, 2009  (CN) .......................... 2009 1 0223721

(51) Int. Cl.
| G06F 3/041 | (2006.01) |
| G06F 3/044 | (2006.01) |
| H01H 1/02 | (2006.01) |
| H05K 1/00 | (2006.01) |
| B29C 65/00 | (2006.01) |

(52) U.S. Cl.
USPC .......... 345/173; 178/18.06; 174/254; 156/60; 977/742; 200/511

(58) Field of Classification Search
USPC ................. 345/173–178; 216/13–20; 977/720
See application file for complete search history.

(56) References Cited

U.S. PATENT DOCUMENTS

| 6,356,259 | B1 * | 3/2002 | Maeda et al. .................. 345/173 |
| 7,045,108 | B2 | 5/2006 | Jiang et al. |
| 7,704,480 | B2 | 4/2010 | Jiang et al. |
| 8,585,855 | B2 * | 11/2013 | Jiang et al. ..................... 156/281 |
| 2006/0010996 | A1 * | 1/2006 | Jordan et al. .................. 73/866.1 |
| 2007/0074316 | A1 * | 3/2007 | Alden et al. .................. 977/762 |
| 2007/0298253 | A1 * | 12/2007 | Hata et al. ...................... 428/339 |
| 2008/0248235 | A1 | 10/2008 | Feng et al. |
| 2008/0299031 | A1 | 12/2008 | Liu et al. |
| 2009/0153503 | A1 | 6/2009 | Jiang et al. |
| 2009/0153508 | A1 * | 6/2009 | Jiang et al. ..................... 345/173 |
| 2009/0153515 | A1 | 6/2009 | Jiang et al. |
| 2009/0160819 | A1 * | 6/2009 | Sasaki et al. .................. 345/174 |
| 2009/0167709 | A1 | 7/2009 | Jiang et al. |
| 2009/0197038 | A1 | 8/2009 | Wang et al. |
| 2009/0297732 | A1 | 12/2009 | Jiang et al. |
| 2010/0007619 | A1 * | 1/2010 | Jiang et al. ..................... 345/173 |

FOREIGN PATENT DOCUMENTS

| CN | 101308308 | 11/2008 |
| CN | 101458596 | 6/2009 |
| CN | 101458603 | 6/2009 |

(Continued)

*Primary Examiner* — Dwayne Bost
*Assistant Examiner* — Nalini Mummalaneni
(74) *Attorney, Agent, or Firm* — Novak Druce Connolly Bove + Quigg LLP

(57) ABSTRACT

The present disclosure relates to a touch panel includes a transparent insulator and two electrode plates. Each of the two electrode plates includes a transparent conductive layer. The transparent insulator is located between two transparent conductive layers. The transparent insulator has a refractive index larger than 1.0 which can reduce a chromatic dispersion to improve a display effect of the touch panel. The transparent insulator is a continuous layer in a solid state.

11 Claims, 7 Drawing Sheets

(56) References Cited

FOREIGN PATENT DOCUMENTS

| CN | 101470565 | 7/2009 |
| TW | 200539005 | 12/2005 |
| WO | WO2007015710 | 2/2007 |

\* cited by examiner

TOUCH PANEL WITH TRANSPARENT INSULATOR TO REDUCE CHROMATIC DISPERSION AND DISPLAY DEVICE INCLUDING THE SAME

CROSS-REFERENCE TO RELATED APPLICATIONS

This application claims all benefits accruing under 35 U.S.C. §119 from China Patent Application No. 200910223721.8, filed on 2009 Nov. 18, in the China Intellectual Property Office, the disclosure of which is incorporated herein by reference.

BACKGROUND

1. Technical Field

The disclosure relates to touch panels and, particularly, to a carbon nanotube-based touch panel and a display device incorporating the same.

2. Description of Related Art

Various electronic apparatuses such as mobile phones, car navigation systems and the like are equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation.

Resistive, capacitive, infrared, and surface acoustic wave touch panels have been developed. Resistive and capacitive touch panels are widely applied because of the higher accuracy and low cost of production.

A resistive or capacitive touch panel often includes a layer of indium tin oxide (ITO) as an optically transparent conductive layer. The ITO layer is generally formed by ion beam sputtering, a relatively complicated undertaking. Furthermore, the ITO layer has poor wearability, low chemical endurance and uneven resistance over the entire area of the panel, as well as relatively low transparency. Such characteristics of the ITO layer can significantly impair sensitivity, accuracy, and brightness.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
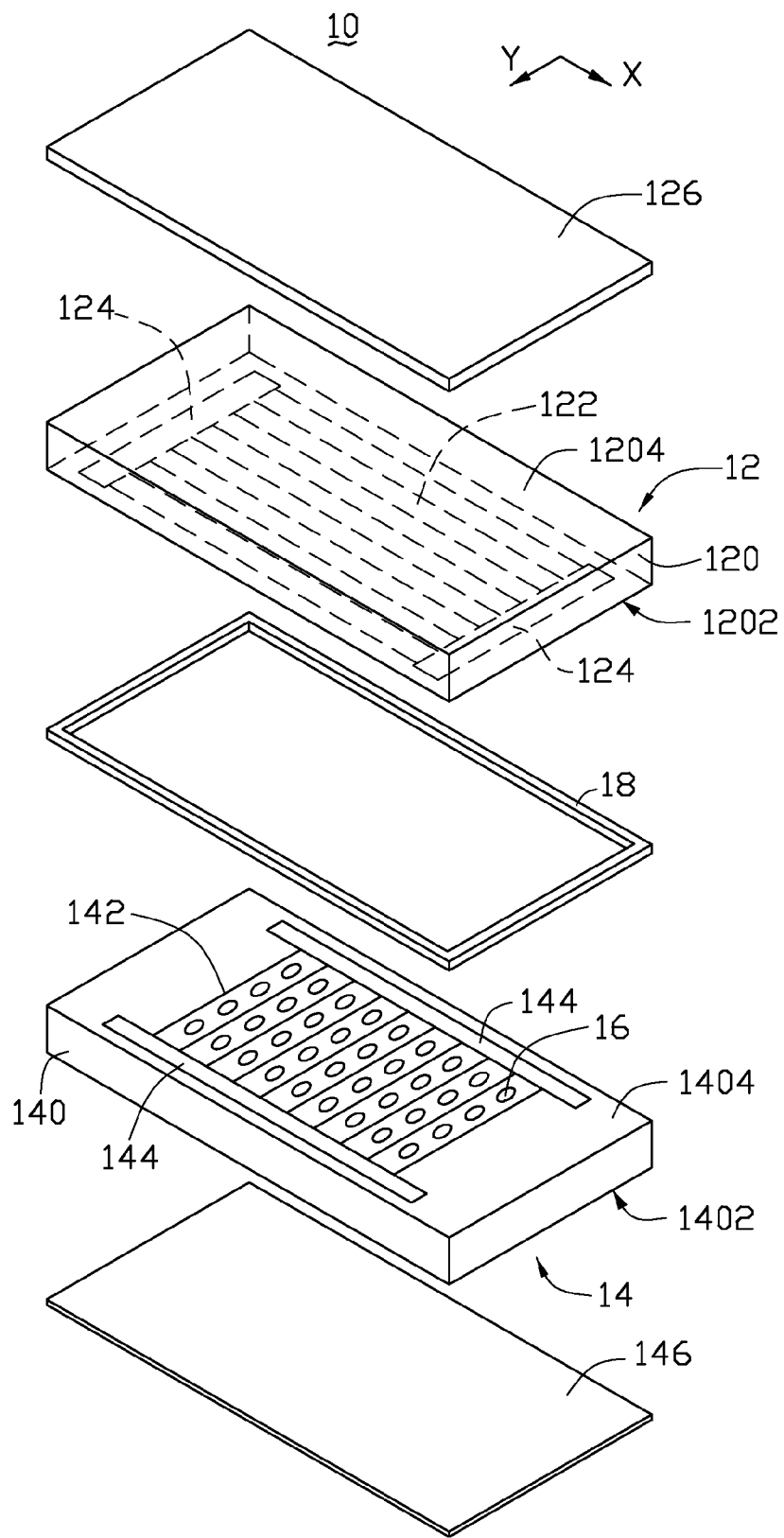
FIG. 1 is an exploded, isometric view of an embodiment of a touch panel.
Figure 2:
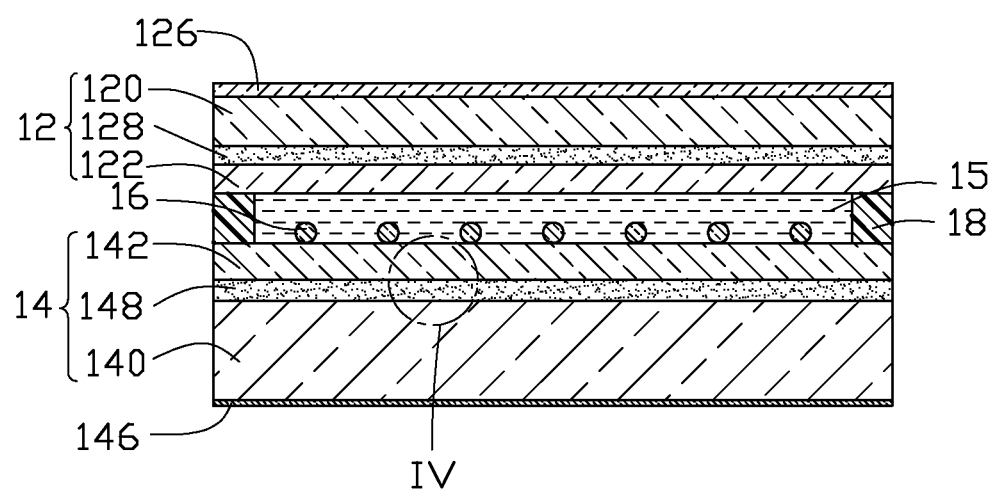
FIG. 2 is a transverse cross-sectional view of the touch panel of FIG. 1 assembled.

Referring to FIG. 1 and FIG. 2, one embodiment of a touch panel 10 comprises a first electrode plate 12, a second electrode plate 14, a transparent insulator 15, a plurality of transparent dot spacers 16, an insulating frame 18, a transparent protective film 126, and a shielding layer 146.

Generally, the first electrode plate 12 is opposite to and spaced from the second electrode plate 14. The transparent insulator 15, the dot spacers 16, and the insulating frame 18 are disposed between the first electrode plate 12 and the second electrode plate 14. The insulating frame 18 separates the first electrode plate 12 from the second electrode plate 14. The transparent dot spacers 16 are distributed in the transparent insulator 15. The transparent protective film 126 is disposed on a surface of the first electrode plate 12 away from the second electrode plate 14. The shielding layer 146 is disposed on a surface of the second electrode plate 14 away from the insulating frame 18.

In detail, the first electrode plate 12 includes a first substrate 120, a first glue layer 128, a first transparent conductive layer 122, and two first electrodes 124. The first substrate 120 includes a first surface 1202 and an opposite second surface 1204, each of which can be substantially flat. The first surface 1202 is opposite to and spaced from the second electrode plate 14. The first transparent conductive layer 122 is adhered to the first surface 1202 by the first glue layer 128. The two first electrodes 124 are located separately on opposite ends of the first transparent conductive layer 122 along a first direction indicated by the X axis shown in FIG. 1. The two first electrodes 124 electrically connect to the first transparent conductive layer 122.

The second electrode plate 14 includes a second substrate 140, a second glue layer 148, a second transparent conductive layer 142, and two second electrodes 144. The second substrate 140 includes a first surface 1402 and an opposite second surface 1404, each of which can be substantially flat. The second surface 1404 is opposite to and spaced from the first electrode plate 12. The second transparent conductive layer 142 is adhered to the second surface 1404 via the second glue layer 148. The two second electrodes 144 are located separately on opposite ends of the second transparent conductive layer 142 along a second direction indicated by the Y axis shown in FIG. 1. The two second electrodes 144 electrically connect to the second transparent conductive layer 142.

The second transparent conductive layer 142 and the two second electrodes 144 are opposite to and spaced from the first transparent conductive layer 122 and the two first electrodes 124. The distance between the first transparent conductive layer 122 and the second transparent conductive layer 142 can range from about 2 μm to about 10 μm. The X axis can cross the Y axis. In this embodiment, the X axis is substantially perpendicular to the Y axis, such that the two second electrodes 144 are substantially orthogonal to the two first electrodes 124.

The first substrate 120 is a transparent and flexible film/plate made of polymer, resin, or any other flexible material. The second substrate 140 is a transparent board made of glass, diamond, quartz, plastic or any other suitable material. The second substrate 140 can be made of a flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins. The thickness of each of the first substrate 120 and the second substrate 140 can range from about 1 mm to about 1 cm. In this embodiment, the first substrate 120 and the second substrate 140 are made of PET, and each has a thickness of about 2 mm.

The first glue layer 128 can be used to adhere the first transparent conductive layer 122 to the first surface 1202 of the first substrate 120. The second glue layer 148 can be used to adhere the second transparent conductive layer 142 to the second surface 1404 of the second substrate 140. The refractive index of each of the first glue layer 128 and the second glue layer 148 can range from about 1.30 to about 1.80. Each of the first glue layer 128 and the second glue layer 148 can be made of thermoplastic glue or UV (Ultraviolet Rays) glue, such as polymethyl methacrylate, polyvinyl chloride (PVC). In this embodiment, each of the first glue layer 128 and the second glue layer 148 has a refractive index in the range from about 1.45 to about 1.53.

Each of the first transparent conductive layer 122 and the second transparent conductive layer 142 can be or can include a carbon nanotube structure formed of a plurality of carbon nanotubes. A larger number of the carbon nanotubes in the carbon nanotube structure are arranged substantially along the same axis. The carbon nanotube structure can comprise at least one carbon nanotube film. In one embodiment, the carbon nanotube structure can comprise at least two stacked carbon nanotube films or a plurality of carbon nanotube films contiguously disposed side by side, and carbon nanotubes in the carbon nanotube films are arranged to be substantially oriented along the same direction.

Figure 3:
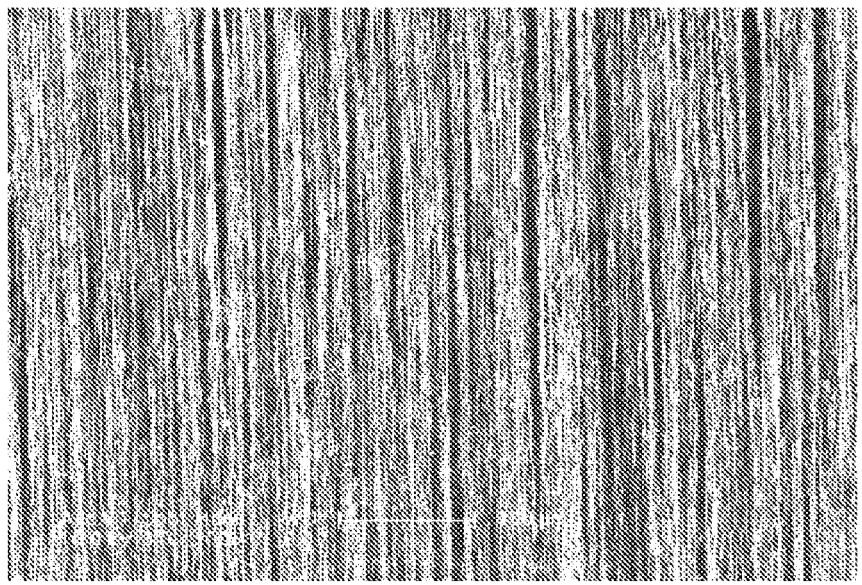
FIG. 3 shows a Scanning Electron Microscope (SEM) image of a transparent conductive layer of FIG. 1.

FIG. 3 shows a carbon nanotube film. The carbon nanotube film includes a plurality of carbon nanotubes that can be arranged substantially parallel to a surface of the carbon nanotube film. A large number of the carbon nanotubes in the carbon nanotube film can be oriented along a preferred orientation, meaning that a large number of the carbon nanotubes in the carbon nanotube film are arranged substantially along the same direction. An end of one carbon nanotube is joined to another end of an adjacent carbon nanotube arranged substantially along the same direction, by Van der Waals attractive force. A small number of the carbon nanotubes are randomly arranged in the carbon nanotube film, and has a small if not negligible effect on the larger number of the carbon nanotubes in the carbon nanotube film arranged substantially along the same direction. The carbon nanotube film is capable of forming a freestanding structure. The term "freestanding structure" can be defined as a structure that does not have to be supported by a substrate. For example, a freestanding structure can sustain its weight when hoisted by a portion thereof without any significant damage to its structural integrity. So, if the carbon nanotube film is placed between two separate supporters, a portion of the carbon nanotube film, not in contact with the two supporters, would be suspended between the two supporters and yet maintain film structural integrity. The freestanding structure of the carbon nanotube film is realized by the successive carbon nanotubes joined end to end by Van der Waals attractive force.

It can be appreciated that some variation can occur in the orientation of the carbon nanotubes in the carbon nanotube film as can be seen in FIG. 3. Microscopically, the carbon nanotubes oriented substantially along the same direction may not be perfectly aligned in a straight line, and some curve portions may exist. It can be understood that some carbon nanotubes located substantially side by side and oriented along the same direction may be in contact with each other can not be excluded.

Figure 4:
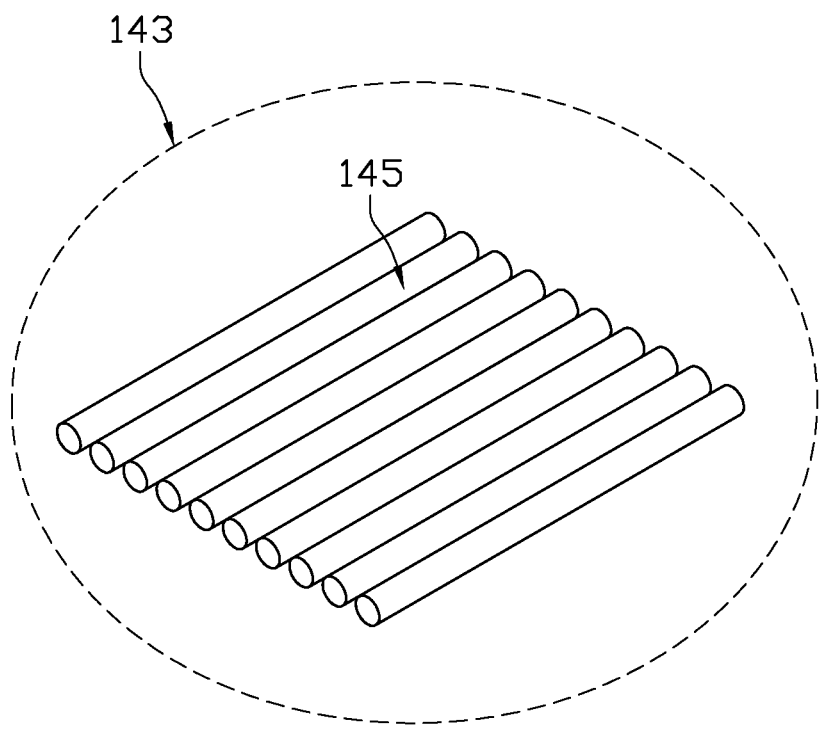
FIG. 4 is a schematic, enlarged view of a carbon nanotube segment in the transparent conductive layer of FIG. 3.

More specifically, referring to FIG. 4, the carbon nanotube film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity and shape. The carbon nanotubes 145 in the carbon nanotube film are also substantially oriented along a preferred orientation.

Examples of carbon nanotube films are taught by U.S. Pat. No. 7,045,108 to Jiang et al., and US Publication No. 20080248235 to Feng et al. Because the carbon nanotubes provide superior strength, mechanical integrity, and uniform conductivity to the carbon nanotube film, the touch panel 10 and a display device using the carbon nanotube film are durable and highly conductive.

The carbon nanotubes in the carbon nanotube structure can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 μm to about 900 μm.

It can be appreciated that one of the first transparent conductive layer 122 and the second transparent conductive layer 142 can be a carbon nanotube film, and the other can be an indium tin oxides (ITO) layer or an antimony tin oxide (ATO) layer.

The first electrodes 124 and the second electrodes 144 can be made of electrically conductive materials, such as metal or carbon nanotubes. In one embodiment, the first electrode 124 and the second electrode 144 are made of silver.

The transparent insulator 15 can be filled between the first transparent conductive layer 122 and the second transparent conductive layer 142. The transparent insulator 15 contacts both of the first transparent conductive layer 122 and the second transparent conductive layer 142. The transparent insulator 15 insulates the first transparent conductive layer 122 from the second transparent conductive layer 142. If a user presses the first electrode plate 12, the resulting deformation of the first electrode plate 12 causes a deformation of the transparent insulator 15. The deformation of the transparent insulator 15 causes a connection between the first transparent conductive layer 122 and the second transparent conductive layer 142. If the pressure causing deformation of the first electrode plate 12 ceases, the transparent insulator 15 restores to a former condition or position, so that the first transparent conductive layer 122 and the second transparent conductive layer 142 are insulated from each other by the transparent insulator 15.

Figure 6:
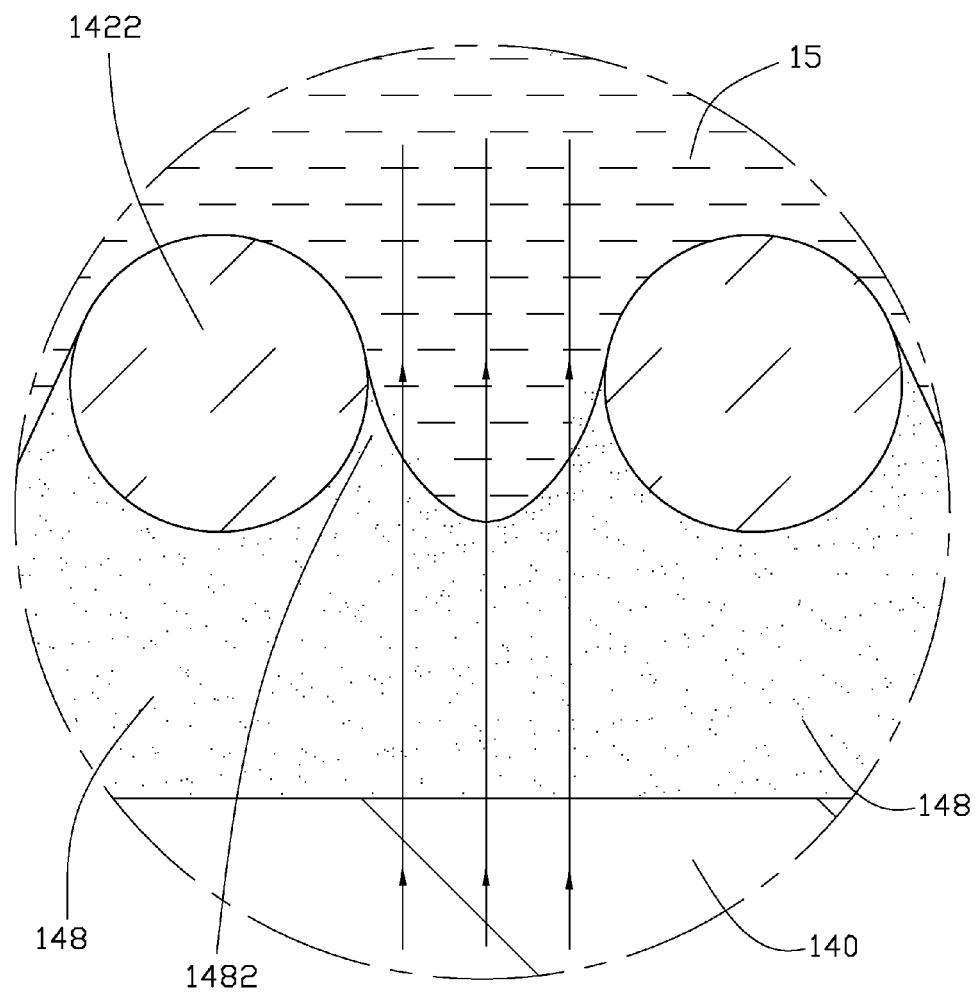
FIG. 6 is a schematic, enlarged view of light paths of light beams passing through circled portion IV of FIG. 2.

Referring to FIG. 6, because the second transparent conductive layer 142 is a carbon nanotube structure having a plurality of carbon nanotubes 1422 and a plurality of clearances respectively defined between the carbon nanotubes 1422, portions of the second glue layer 148 close to the carbon nanotubes 1422 climb up to surfaces of the adjacent carbon nanotubes 1422 under surface tensions therebetween, whereby protrusions or concave-like structures 1482 are formed on a surface of the second glue layer 148. The concave-like structures 1482 means that heights of the second glue layer 148 in the middle of the adjacent carbon nanotubes 1422 are lower than that of the second glue layer 148 close to the adjacent carbon nanotubes 1422. As shown in FIG. 6, each concave-like structure 1482 is similar to two triple prisms.

The transparent insulator 15 is also filled in the clearances and contacts with the second glue layer 148. Because the carbon nanotubes have light absorption properties, light beams must pass through the second glue layer 148 and the transparent insulator 15, to pass through the touch panel 10.

Figure 5:
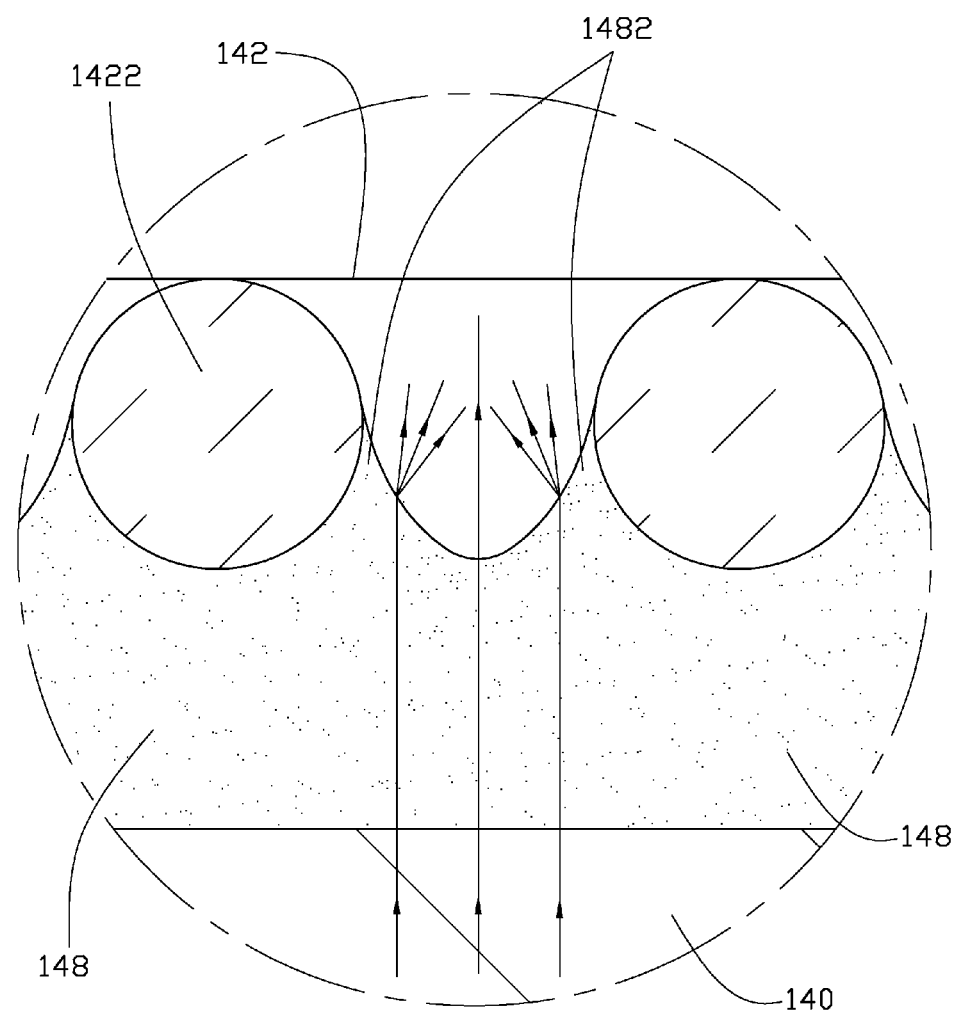
FIG. 5 is a schematic, enlarged view of circled portion IV of FIG. 2, shown without a transparent insulator, and showing light paths of light beams passing through a second transparent conductive layer and a second glue layer.

FIG. 5 shows light paths of light beams passing through the second transparent conductive layer 142 and the second glue layer 148 without a transparent insulator. The chromatic dispersion easily occurs when light beams emitted from air pass through the triple prisms. A refractive index of the second glue layer 148 is much different from that of vacuum or air, such that the concave-like structures 1482 can function as triple prisms. When the light beams pass through the concave-like structures 1482 of the second glue layer 148, chromatic dispersion can occur. As a result, the user will see a plurality of undesired color fringes on the touch panel 10. Thus, the resolution of the touch panel 10 is adversely affected without a transparent insulator.

Further, because the first electrode plate 12 can have the same or a similar structure as that of the second electrode plate 14, chromatic dispersion also occurs when the light beams pass through the concave-like structures of the first electrode plate 12. This further adversely affects the resolution of the touch panel 10 without a transparent insulator.

To improve the display effect of the touch panel 10, the touch panel 10 of this embodiment has adopted the transparent insulator 15 located between the first electrode plate 12 and the second electrode plate 14. The material of the transparent insulator 15 depends on the materials of the first glue layer 128 and the second glue layer 148. The material of the transparent insulator 15 preferably has a refractive index similar to or the same as that of the materials of the first glue layer 128 and the second glue layer 148.

In one embodiment, each of the first glue layer 128 and the second glue layer 148 has a refractive index in the range of from about 1.45 to about 1.53, and the transparent insulator 15 can be made of terpilenol which has a refractive index of about 1.48.

It is to be understood that the material of the transparent insulator 15 is not limited to terpilenol, and the transparent insulator 15 can be made of polyethylene, polyvinyl chloride (PVC), polystyrene, polymethyl methacrylate, purified water, propanol, methanol, ethanol, aether, carbon tetrachloride, white oil, oil of turpentine, olive oil, acetone, carbon bisulfide, glycerin, or trichloromethane. The transparent insulator 15 can be in a liquid state or solid state. If the transparent insulator 15 is in a liquid state, the transparent insulator 15 can be sealed in a chamber defined by the first electrode plate 12, the second electrode plate 14, and the insulating frame 18. If the transparent insulator 15 is in a solid state, the transparent insulator 15 can be a soft transparent film.

It is to be understood that if one of the first transparent conductive layer 122 and the second conduction layer 142 is not made of carbon nanotube structure, the material of the transparent insulator 15 depends on the refractive index of the corresponding one of the first glue layer 128 and the second glue layer 148. For example, if the first transparent conductive layer 122 is not made of carbon nanotube structure, then the material of the transparent insulator 15 depends on the refractive index of the second glue layer 148 because there are no concave-like structures in the first electrode plate 12.

The functions of the transparent insulator 15 are further illustrated in FIG. 6. When light beams pass from the second glue layer 148 to the transparent insulator 15, chromatic dispersion is very weak or almost non-existent because of the small difference in refractive index between the second glue layer 148 and the transparent insulator 15. In other words, by the presence of the transparent insulator 15 on the concave-like structures 1482, the concave-like structures 1482 can no longer function as triple prisms because the refractive index of the transparent insulator 15 is similar to or the same as that of the second glue layer 148. Thus, the user will not see undesired color fringes resulting from chromatic dispersion caused by the concave-like structures 1482. Similarly, chromatic dispersion is also very weak or almost non-existent in the first electrode 12. Thus, the resolution of the touch panel 10 is improved.

The dot spacers 16 are separately located on the second transparent conductive layer 142. The insulating frame 18 is disposed between the first electrode plate 12 and the second electrode plate 14. The insulating frame 18 and the dot spacers 16 can be made of, for example, insulating resin or any other suitable insulating material. Insulation between the first electrode plate 12 and the second electrode plate 14 is also provided by the insulating frame 18 and the dot spacers 16. It is to be understood that the dot spacers 16 are optional, particularly when the touch panel 10 is relatively small. They serve as supports given the size of the span and the strength of the first electrode plate 12.

The shielding layer 146 is disposed on the first surface 1402 of the second substrate 140. The material of the shielding layer 146 can be ITO film, ATO film, conductive resin film, carbon nanotube film, or another suitable conductive film. In this embodiment, the shielding layer 146 is a carbon nanotube film. The carbon nanotube film includes a plurality of carbon nanotubes, and the orientations of the carbon nanotubes therein can be arbitrarily determined. In this embodiment, the carbon nanotubes in the carbon nanotube film of the shielding layer 146 are arranged along the same axis. The carbon nanotube film is connected to ground and acts as shielding, thus enabling the touch panel 10 to operate without interference (for example, electromagnetic interference).

The transparent protective film 126 disposed on the second surface 1204 of the first substrate 120. The transparent protective film 126 can be directly attached to the first substrate 120 via adhesive, or can be disposed on the first substrate 120 via hot pressing. The material of the transparent protective film 126 can be silicon nitride, silicon dioxide, BCB, polyester, acrylic resin, PET, or any combination thereof. The transparent protective film 126 can also be a plastic film with surface hardening treatment in use. The transparent protective film 126 can also reduce glare and reflection. In the present embodiment, the material of the transparent protective film 126 is PET.

It is also to be understood that the two first electrodes 124 can be disposed on the second electrode plate 14 rather than the first electrode plate 12. In detail, the two first electrodes 124 can be located separately on opposite ends of the second transparent conductive layer 142 along the first direction. The two second electrodes 144 can be located separately on opposite ends of the second transparent conductive layer 142 along the second direction. The two first electrodes 124 and the two second electrodes 144 electrically connect with the second transparent conductive layer 142, respectively. The first direction can be substantially perpendicular to the second direction.

Figure 7:
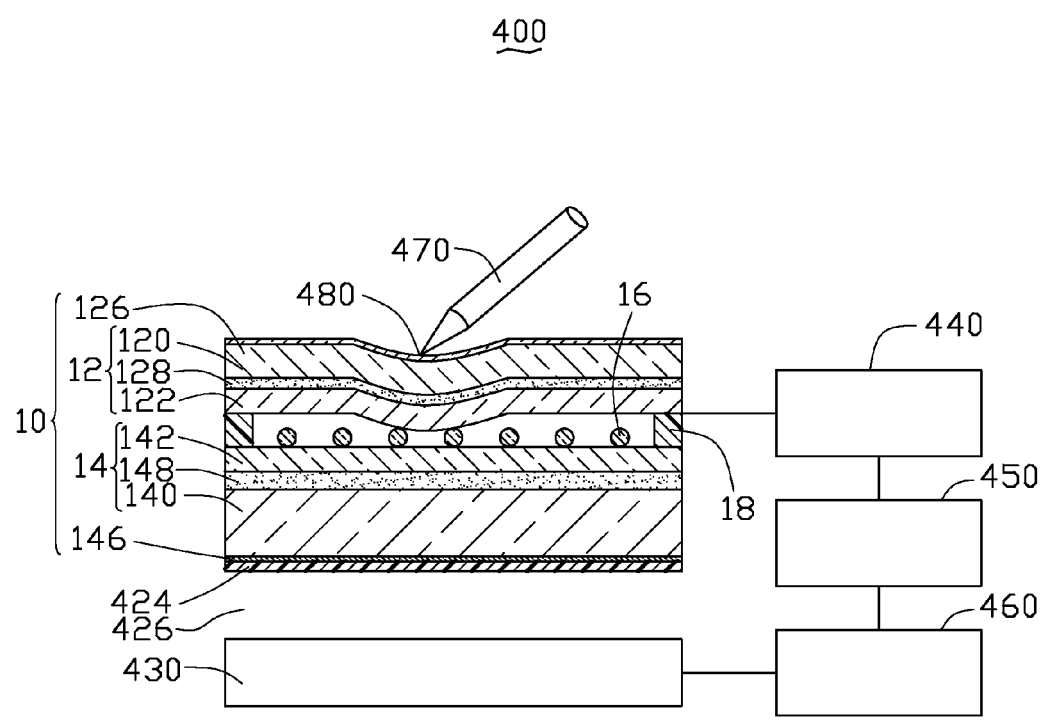
FIG. 7 shows an operating state of a display device using the touch panel of FIG. 1.

Referring to FIG. 7, one embodiment of a display device 400 using the above touch panel 10 is provided. The display device 400 can further comprise a display element 430, a touch panel controller 440, a central processing unit (CPU) 450, and a display element controller 460. The touch panel controller 440, the CPU 450 and the display element controller 460 are electrically connected. The touch panel controller 440 electrically connects with the touch panel 10. In particular, the CPU 450 is connected to the display element controller 460 to control the display element 430.

The display element 430 can be, for example, a conventional display such as a liquid crystal display, field emission display, plasma display, electroluminescent display, vacuum fluorescent display, cathode ray tube, or other display device, or a flexible display such as an e-paper (a microencapsulated electrophoretic display), a flexible liquid crystal display, a flexible organic light emitting display (OLED), or any other flexible display. In this embodiment, the display element 430 can be a liquid crystal display.

The touch panel 10 can be spaced from the display element 430 or installed directly on the display element 430. If the touch panel 10 is installed directly on the display element 430, the touch panel 10 can be attached on the display element 430 by adhesive. Electrical connections between the touch panel 10 and the display element 430 can be provided through built-in ports (not shown). If the touch panel 10 is spaced from the display element 430, the display device 400 can further comprise a passivation layer 424. The passivation layer 424 is located on a surface of the shielding layer 146 and faces the display element 430. The passivation layer 424 can be spaced from the display element 430 a certain distance 426 or can be installed on the display element 430. The passivation layer 424 can protect the display element 430 from chemical or mechanical damage. The passivation layer 424 can be made of benzocyclobutene (BCB), polyester, or acrylics.

In operating the display device 400, a voltage is applied to the first electrode plate 12 and the second electrode plate 14. Contact can be made with the first electrode plate 12 corresponding to elements appearing on the display device 430 by a tool 470 such as a finger, pen, or the like. The resulting deformation of the first electrode plate 12 causes a connection between the first transparent conductive layer 122 and the second conduction layer 142. Changes in voltages in the X axis of the first transparent conductive layer 122 and the Y axis of the second transparent conductive layer 142 are detected by the touch panel controller 440 and sent to the CPU 450 to calculate the position of the deformation. The display element 430 shows desired information under control of the display element controller 460 and the CPU 450.

The carbon nanotube film has high transparency and the carbon nanotubes provide superior strength, so that the brightness and mechanical integrity of the touch panel and the display device using the same are enhanced. Furthermore, the carbon nanotube film, the touch panel, and the display device using the carbon nanotube film are durable and highly conductive. Finally, by the presence of the transparent insulator on the concave-like structures, the concave-like structures cannot function as triple prisms any more because the refractive index of the transparent insulator is similar to or the same as that of the second glue layer, and resolution and display quality are, accordingly, greatly improved.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A touch panel comprising:
    a first electrode plate comprising a first transparent conductive layer, a first substrate, and a first glue layer securing the first transparent conductive layer to the first substrate, wherein the first transparent conductive layer is a carbon nanotube structure having a plurality of carbon nanotubes substantially arranged along a first axis, a plurality of clearances is defined between the plurality of carbon nanotubes, and a first portion of the first glue layer infiltrates into the clearances;
    a second electrode plate comprising a second transparent conductive layer opposite to and spaced from the first transparent conductive layer, a second substrate, and a second glue layer securing the second transparent conductive layer to the second substrate, wherein the second transparent conductive layer is a carbon nanotube structure having a plurality of carbon nanotubes substantially arranged along a second axis; a plurality of clearances is defined between the carbon nanotubes of the second transparent conductive layer, and a first portion of the second glue layer infiltrates into the clearances of the second transparent conductive layer; and
    a transparent insulator located between and contacting the first transparent conductive layer and the second transparent conductive layer, the transparent insulator having a refractive index larger than 1.0, wherein the transparent insulator is a continuous layer in a solid state, a first portion of the transparent insulator infiltrates into the clearances and contacts with the first portion of the first glue layer, a first portion of the transparent insulator infiltrates into the clearances of the second transparent conductive layer and contacts with the first portion of the second glue layer, a connection through the transparent insulator is formed between the first transparent conductive layer and the second transparent conductive layer when the transparent insulator is deformed by pressure, and the transparent insulator is restored to its former condition when the pressure ceases.

2. The touch panel of claim 1, wherein the first axis is substantially perpendicular to an axis from the first electrode plate to the second electrode plate.

3. The touch panel of claim 1, wherein the first portion of the transparent insulator and the first portion of the first glue layer have a plurality of non-flat contact surfaces therebetween.

4. The touch panel of claim 1, wherein the first glue layer has a refractive index in the range from about 1.30 to about 1.80, and the transparent insulator has a refractive index in the range from about 1.30 to about 1.80.

5. The touch panel of claim 4, wherein the transparent insulator is made of polyethylene, polyvinyl chloride (PVC), polystyrene, or polymethyl methacrylate.

6. The touch panel of claim 4, wherein the first glue layer is made of thermoplastic glue or ultraviolet rays glue.

7. The touch panel of claim 1, further comprising a plurality of transparent dot spacers distributed in the transparent insulator.

8. The touch panel of claim 1, further comprising an insulating frame disposed between the first electrode plate and the second electrode plate, wherein the first electrode plate, the second electrode plate, and the insulating frame together define a chamber, and the transparent insulator is sealed in the chamber.

9. A display device comprising:
a touch panel comprising:
a first electrode plate comprising a first transparent conductive layer;
a second electrode plate spaced from the first electrode plate, the second electrode plate comprising a second transparent conductive layer opposite to and spaced from the first transparent conductive layer; and
a transparent insulator located between and contacting with the first transparent conductive layer and the second transparent conductive layer, the transparent insulator having a refractive index larger than 1.0, wherein the transparent insulator being a continuous layer in a solid state, a connection through the transparent insulator is formed between the first transparent conductive layer and the second transparent conductive layer when the transparent insulator is deformed by pressure, and the transparent insulator is restored to its former condition when the pressure ceases;
wherein the first electrode plate further comprises a first substrate and a first glue layer securing the first transparent conductive layer to the first substrate; the second electrode plate further comprises a second substrate and a second glue layer securing the second transparent conductive layer to the second substrate; each of the first transparent conductive layer and the second transparent conductive layer comprises a carbon nanotube structure comprising a plurality of carbon nanotubes arranged primarily along the same aligned axis, a plurality of clearances is defined between the carbon nanotubes of each of the first transparent conductive layer and the second transparent conductive layer; a first portion of the transparent insulator infiltrates into the clearances and a first portion of the first glue layer infiltrates into the clearances of the first transparent conductive layer and contact with the transparent insulator, and a first portion of the second glue layer infiltrates into the clearances of the second transparent conductive layer and contact with the transparent insulator, each of the first glue layer and the second glue layer has a refractive index in the range from about 1.30 to 1.80, and the transparent insulator has a refractive index in the range from about 1.30 to 1.80.

10. The touch panel of claim 1, wherein the carbon nanotube structure is a freestanding structure.

11. The touch panel of claim 1, wherein the first electrode plate further comprises two first electrodes located on and electrically connected with opposite ends of the first transparent conductive layer, a direction from one of the two first electrodes to the other one of the two first electrodes is substantially parallel to the first axis, the second electrode plate further comprises two second electrodes located on and electrically connected with opposite ends of the second transparent conductive layer, a direction from one of the two first electrodes to the other one of the two first electrodes is substantially parallel to the second axis, the first axis is substantially perpendicular to the second axis.

* * * * *